United States Patent
Gordy et al.

(10) Patent No.: US 7,226,234 B2
(45) Date of Patent: Jun. 5, 2007

(54) ARRANGEMENT AND METHOD FOR CONNECTING A ROD END TO A HEADED PIN

(75) Inventors: Donald G. Gordy, Mobarly, MO (US); Gregory P. Ruhlander, Hannibal, MO (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 10/627,346

(22) Filed: Jul. 25, 2003

(65) Prior Publication Data
US 2004/0037624 A1 Feb. 26, 2004

Related U.S. Application Data

(63) Continuation-in-part of application No. 10/449,744, filed on May 30, 2003.

(60) Provisional application No. 60/400,082, filed on Jul. 31, 2002.

(51) Int. Cl.
*F16D 1/00* (2006.01)

(52) U.S. Cl. ............... 403/344; 403/141; 403/142; 403/143; 403/311

(58) Field of Classification Search ........ 403/141–143, 403/161, 163, 310, 311, 313, 344, 289, 290; 74/469; 267/189; 280/93.511; 464/181, 464/180, 89
See application file for complete search history.

(56) References Cited

U.S. PATENT DOCUMENTS

| | | | |
|---|---|---|---|
| 4,118,131 A | 10/1978 | Schnitzius | |
| 4,225,261 A * | 9/1980 | Marx | ............... 403/122 |
| 4,406,177 A | 9/1983 | Bennett et al. | |
| 4,581,953 A | 4/1986 | Walston et al. | |
| 4,590,819 A | 5/1986 | Spease et al. | |
| 4,595,310 A | 6/1986 | Ausprung | |
| 4,776,720 A | 10/1988 | Nolen | |
| 5,046,766 A * | 9/1991 | Lomberty et al. | ........... 285/419 |
| 5,219,242 A * | 6/1993 | Liaw | ............... 403/380 |
| 5,385,373 A * | 1/1995 | Love | ............... 292/307 B |
| 5,613,792 A * | 3/1997 | Terada et al. | ............... 403/131 |
| 5,682,798 A | 11/1997 | Malone | |
| 5,865,558 A * | 2/1999 | Cebollero | ............... 403/133 |
| 6,161,451 A | 12/2000 | Gleason, II | |
| 6,241,730 B1 | 6/2001 | Alby | |
| 6,257,563 B1 * | 7/2001 | Oellers | ............... 267/189 |

(Continued)

FOREIGN PATENT DOCUMENTS

CH 503917 11/1969

(Continued)

*Primary Examiner*—Daniel P. Stodola
*Assistant Examiner*—Michael P. Ferguson
(74) *Attorney, Agent, or Firm*—John R. Benefiel; Dean B. Watson

(57) ABSTRACT

A connection for a rod and pin includes a two piece housing molded from hard plastic which defining a cavity enclosing a soft elastomeric isolator on one end of the rod. The housing pieces also define a pin receiving cavity with retention prongs which engage and hold a pin inserted therein. The housing pieces are able to be snap fit assembled by interfitting prongs and receptacles formed on each housing piece. The housing pieces are molded together as one part, connected by an integral hinge allowing the housing parts to be swung into abutment with each other to be snap fit together.

13 Claims, 4 Drawing Sheets

U.S. PATENT DOCUMENTS

2004/0037624 A1    2/2004    Gordy et al.

FOREIGN PATENT DOCUMENTS

| | | |
|---|---|---|
| DE | 3 422 926 | 6/1984 |
| DE | 296 12 817 | 10/1996 |
| DE | 197 17 446 | 1/1998 |
| DE | 197 31 039 | 1/1999 |
| DE | 198 13 721 | 10/1999 |
| DE | 29919408 U1 | 3/2000 |
| DE | 199 27 055 | 12/2000 |
| EP | 0 960 798 | 12/1999 |
| FR | 2 355 197 | 1/1978 |
| FR | 2 634 839 | 2/1990 |
| GB | 624748 | 6/1949 |
| JP | 02195010 A | 8/1990 |

* cited by examiner

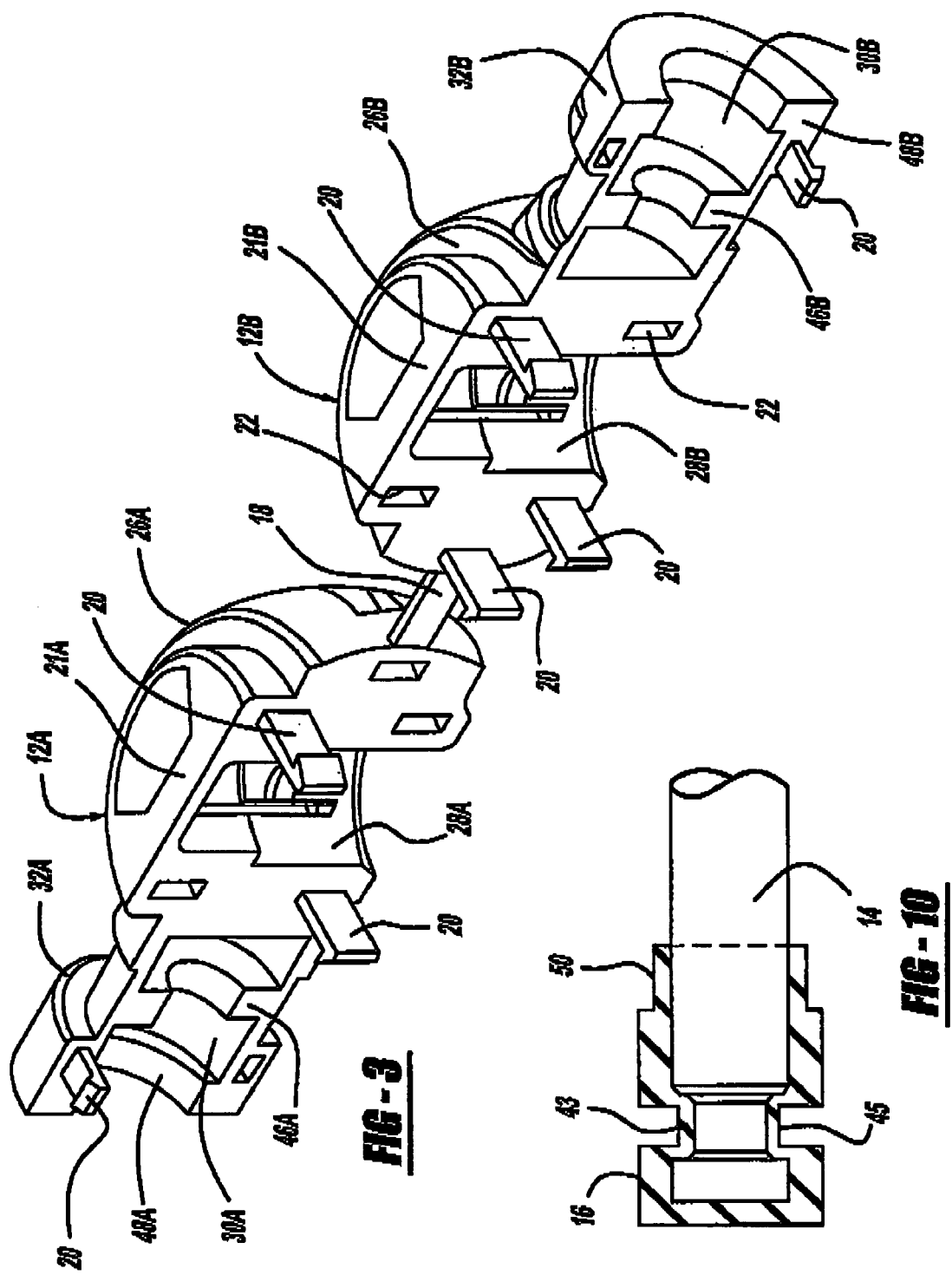

ARRANGEMENT AND METHOD FOR CONNECTING A ROD END TO A HEADED PIN

CROSS REFERENCE TO RELATED APPLICATION

This application claims the benefit of U.S. provisional application Ser. No. Ser. No. 60/400,082, filed Jul. 31, 2002 and is a continuation-in-part of U.S. application Ser. No. 10/449,744, filed May 30, 2003.

BACKGROUND OF THE INVENTION

This invention concerns mechanical connections between control rod ends and a pivot pin, as are commonly used to connect control rods to a pin in transmission linkages for automobiles.

In these connections, it is now usual to incorporate a soft elastomeric isolator between the rod and the pin to minimize the transmission of vibrations to a shift lever for example which is gripped by the hand of the driver of an automobile. A disadvantage of such isolators has been the looseness or lash introduced into the connection by the pin contact compressing the isolator material.

Such looseness has also been introduced by the clearances necessary to assemble the component parts of the connection.

Labor costs are also incurred by the need to fit together complex components to complete the connection when the automobile is assembled, and the need to insure proper assembly.

Another difficulty has been involved in attempting to reduce the force necessary to fit the pin to the connection to simplify assembly while still insuring that an adequately high separation force would be required to disconnect the pin after the connection is made to prevent unintended disconnection.

It is the object of the present invention to provide an arrangement and method for connecting one end of a rod to a headed pin which incorporates a vibration isolator without introducing excessive looseness in the connection.

It is another object of the present invention to provide such an arrangement and method in which there are minimal clearances necessary for assembly purposes.

It is yet another object of the present invention to provide such an arrangement and method which requires only low installation forces while insuring that separation forces are sufficiently high to preclude unintended disconnection of the components.

SUMMARY OF THE INVENTION

The above recited objects and other objects which will become apparent upon a reading of the following specification and claims are achieved by an arrangement and method for connecting a rod end to a headed pin, the arrangement including a housing defining a pin receiving cavity with integral retention features in the cavity engaging the headed pin so as to be retained therein. A soft elastomeric isolator is interposed between portions of the housing and the one end of the rod. The housing is formed by assembling two housing pieces together so as to enclose the vibration isolator and the one end of the rod. Both housing pieces are preferably molded as a single part from a hard plastic, with a connecting integral hinge allowing the pieces to be swung together to bring complementary faces into abutment with each other.

Molded contact prongs project inwardly from a recess portion of each housing piece, the recess of each housing piece together defining a pin receiving cavity. The contact prongs engage the underside of a head on the pin to capture the same when the assembled housing is pushed onto the pin.

The contact prongs are shaped to be easily deflected by contact with a head on the pin to allow entry of the pin but to thereafter strongly resist pull out of the pin to provide a secure connection.

The housing pieces are also formed with semicircular recesses which together form a generally cylindrical ribbed cavity which captures the isolator when the housing pieces are assembled together. Engaging features comprised of assembly prongs project from each abutting housing piece face, and are each received in a corresponding receptacle on the opposite piece face to fix the two housing pieces together. The isolator is comprised of a soft elastomeric material which is itself assembled or molded to a ribbed rod end to be secured thereto.

The isolator has relatively thin thicknesses subject to compression to limit movement thereof as a result of its compression while preventing the transmission of vibrations from the rod end to the hard plastic housing and metal pin. An interference fit between the isolator and the portions of housing pieces moved into engagement with the isolator when the housing pieces are assembled together insures that no looseness or lash will be created at assembly as with previous designs, while not requiring an overmolding process.

An orientation feature is molded integrally with the housing pieces preventing assembly to the pin in the wrong orientation to further simplify making of the rod end connection.

DESCRIPTION OF THE DRAWINGS

FIG. 3 is a perspective view of the two housing pieces prior to being swung towards each other with the rod end and isolator received in a recess of one of the housing pieces.

FIG. 10 is an enlarged view of a rod end with a sectional view of an isolator disposed thereon.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
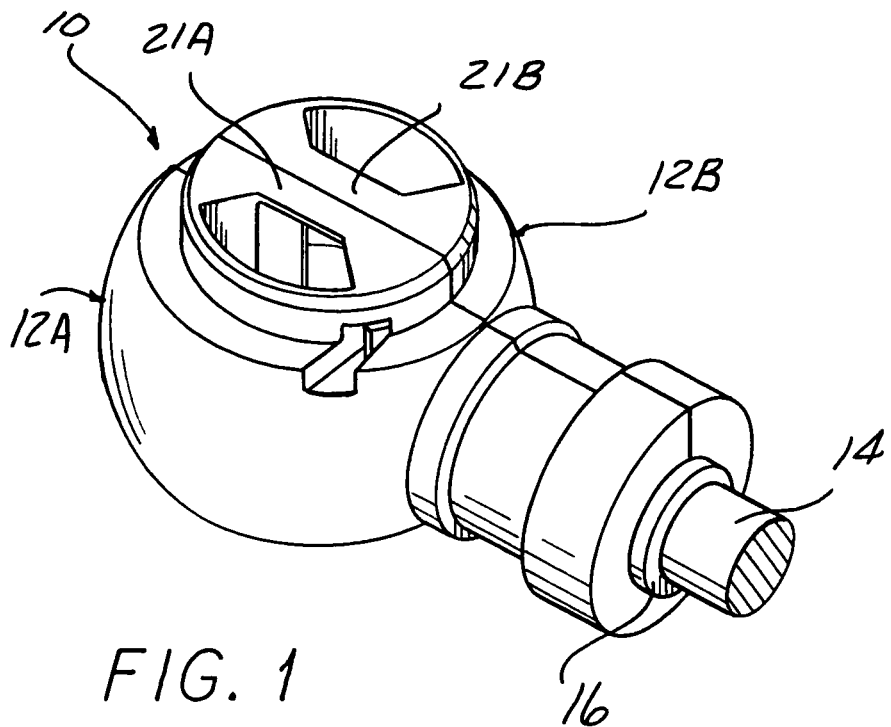
FIG. 1 is a top perspective view of a rod-pin connection housing constructed according to the invention and assembled to an isolator and rod end.
Figure 2:
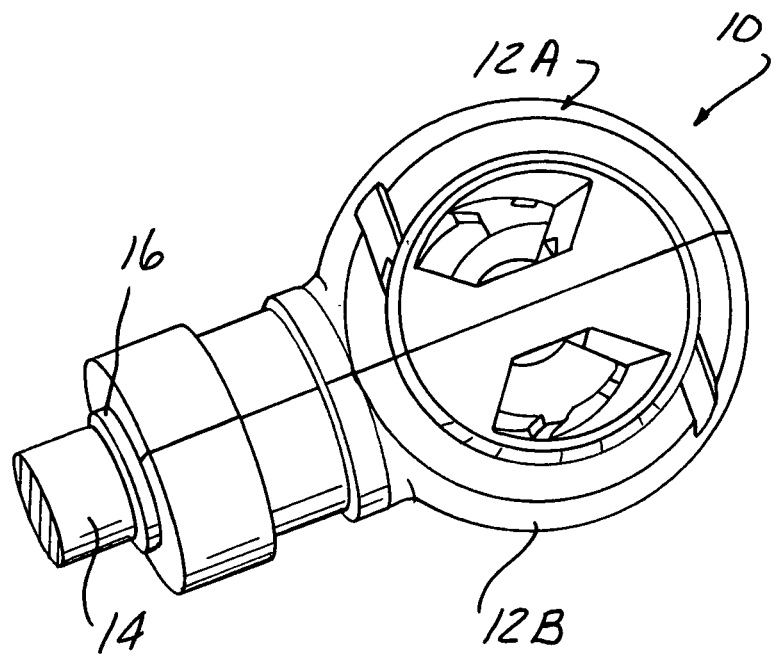
FIG. 2 is a perspective view from a steeper angle of the connection components shown in FIG. 1.

Referring to the drawings, FIGS. 1 and 2 show a rod end connection housing 10, comprised of two housing pieces 12A, 12B assembled together with complementary faces 34A, 34B (FIGS. 3, 4) thereof in abutment with each other and capturing a steel rod end 14 and isolator 16.

Figure 4:
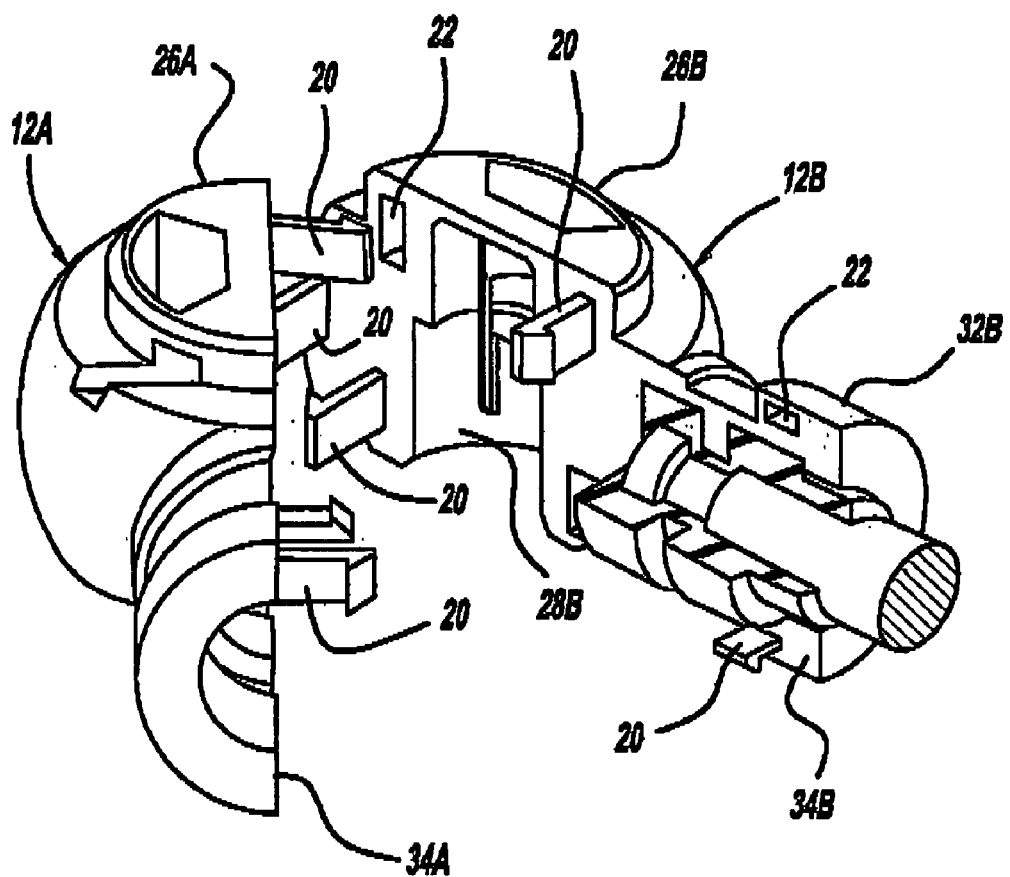
FIG. 4 is a perspective view of the two housing pieces partially swung together with the rod end and isolator in position in the recess of one of the two housing pieces.
Figure 6:
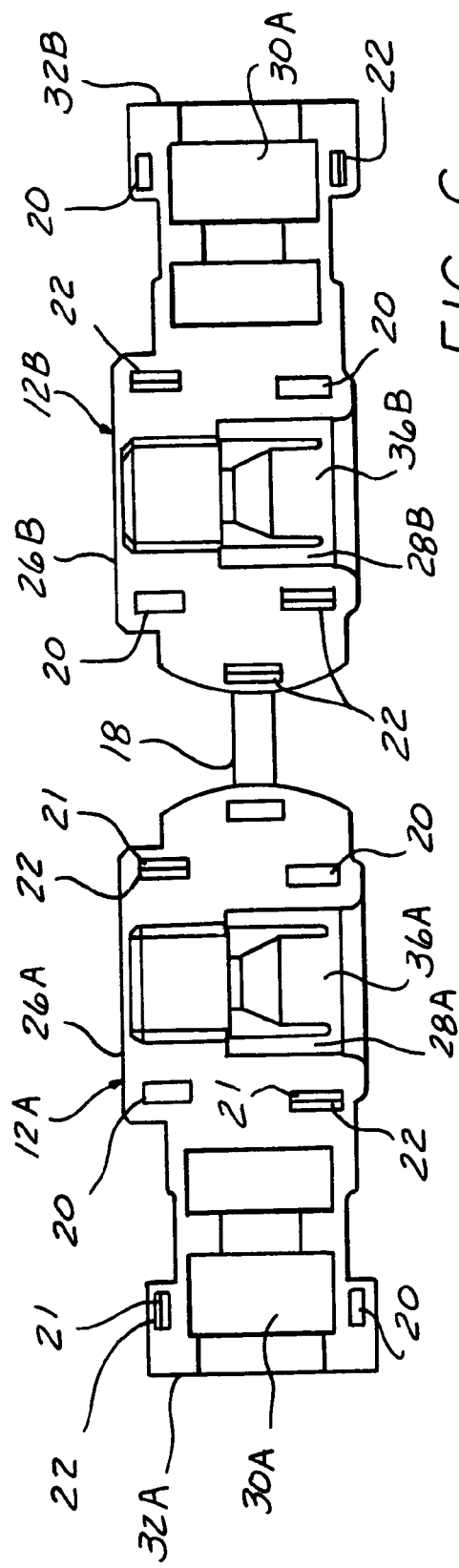
FIG. 6 is a front view of the two housing pieces as molded connected together, shown in a spread apart position.
Figure 9:
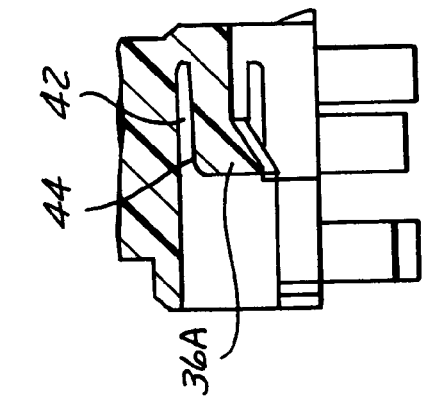
FIG. 9 is a view of the section 9—9 taken in FIG. 7.
Figure 8:
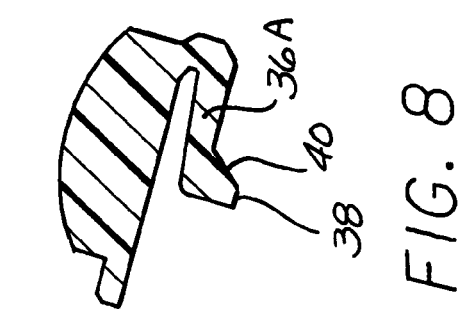
FIG. 8 is a view of the section 8—8 taken in FIG. 7.
Figure 7:
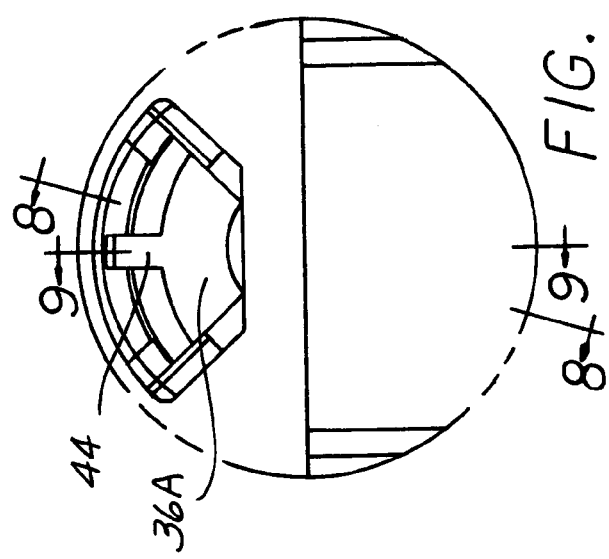
FIG. 7 is a top view of a contact prong portion of one of the two housing pieces.

FIGS. 3, 4 and 6 show the housing pieces 12A, 12B separated prior to being assembled together.

Both housing pieces 12A, 12B are molded as one part, in an end-to-end relationship connected by an integral hinge 18. The housing pieces 12A, 12B are identical except for the reversal of locations of a series of assembly prongs 20 and mating prong receptacles 22.

The housing pieces 12A, 12B are molded from a hard plastic such as Dow Vydne™ (Nylon 66%, graphite filled 33%), Rockwell hardness scale M95 (ASTM D785) or similar materials so as to not be readily compressed by contact pressure exerted by the pin 24 (FIG. 5) to which it is to be assembled.

Each housing piece 12A, 12B is molded with a main portion 26A, 26B having a semicircular recess 28A, 28B which together form a generally cylindrical pin receiving opening when the housing pieces 12A, 12B are assembled together.

Similarly, generally semicircular ribbed recesses 30A, 30B are molded into end portions 32A, 32B.

Barbed assembly prongs 20 project normally from respective abutment faces 34A, 34B of each housing piece 12, 12B, and are captured when inserted into complementary receptacles 22 by suitable ridges 21 formed in each receptacle capturing the barbed end of each prong 20 when inserted therein as the housing pieces 12A, 12B are swung together.

Each housing piece 12A, 12B is formed with a contact prong 36A, 36B extending parallel to the pin receiving recess 28A, 28B.

As shown in FIGS. 7–10, a lip portion 38 thereof is formed at an upper end of each contact prong 36A, 36B, having a sloping lip surface 40 at the bottom adjacent the entry and of recess 28A and a relatively blunt top surface 46 at the end of each contact prong 36A, 36B.

A clearance space 42 allows limited outward deflection during pin insertion until contact of a rib 44 with the outer wall defining recess 28A, 28B.

The sloping lip surface 40 of each contact prong 36A, 36B allows insertion of the pin 24 by radial deflection of the contact prong 36A, 36B while the pressure on the blunt top surfaces 41 is strongly resisted to prevent withdrawal and thus to provide high separation forces. These forces can be designed for by selection of the configuration of each contact prong 36A, 36B.

The housing pieces 12A, 12B are also each integrally formed with a pin blocking orientation 21A, 21B respectively which extend over one end of the recesses 28A, 28B which block entry of the pin 24 from the wrong side.

The isolator 16 is molded from a soft elastomer such as the following thermoplastic polyester elastomers:

Dupont Hytrel™ 5526,
Bayer Desmopan™ 453, Shore hardness 53D (ASTM D2240)
Dupont Hytrel™ 4069
Bayer Texin 285
Bayer Texin 270
Bayer Desmopan™ 460
Novi Estane 58133 (formerly BF Goodrich).

The isolator 16 is preferably molded onto the steel rod end 14 as shown in FIGS. 3 and 10, although it could be separately molded and assembled thereto, the rod end 14 formed with a wide groove 43 into which the material of the isolator 16 extends. The isolator 16 is itself formed with an intermediate groove 45 aligned with the rod groove 43 into which a land 46A, 46B on each housing piece end portion 32A, 32B extends to create a secure interlock by an interference fit between the housing pieces and isolator when the housing pieces are moved to engage the isolator 16 when assembled together which avoids the presence of any looseness or lash. A land 48A, 48B of each end portion 32A, 32B also projects over a shoulder 50 of the isolator 16 to further strengthen the connection.

Figure 5:
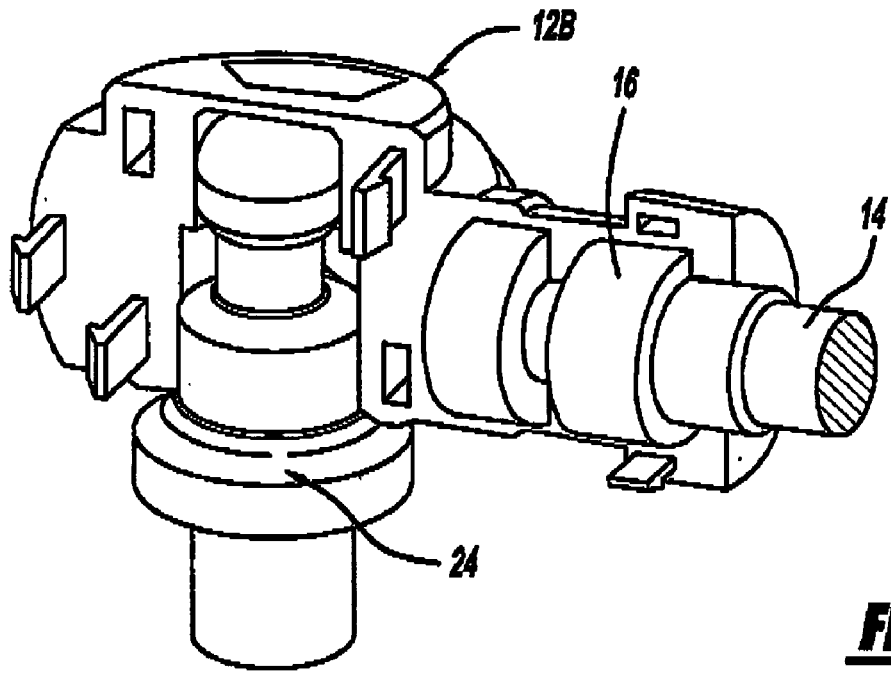
FIG. 5 is a perspective view from one side of one of the two housing pieces positioned on a headed pin and receiving the rod end and isolator.

As shown in FIGS. 4 and 5, the isolator 16 completely encloses the rod end 14 to prevent any direct contact with the housing pieces 12A, 12B, but the sections which are subjected to compression during service are relatively thin, i.e., 1 mm or less. Also, there is an absence of any points of concentrated compressive stress as occurred when a headed pin was made to bear on a soft elastomeric isolator, such that excessive lash is avoided.

The invention claimed is:

1. In combination with an automotive control linkage, an arrangement for connecting one end of an elongated control rod to a headed pin included in said automotive control linkage, said arrangement establishing a driving connection between said pin and said control rod, said arrangement including:
   a housing defining a pin receiving cavity with retention features around said cavity adapted to engage a portion of said headed pin so as to be captured and retained therein;
   a soft elastomeric isolator fit to said one end of said rod to completely enclose said one end of said rod;
   said housing being split along its longitudinal axis to define two mating pieces assembled and affixed together, each piece having an isolator engaging portion generally opposing an isolator engaging portion of the other piece, said portions together compressing said isolator therebetween to create an interference fit between said housing pieces and said isolator as said two pieces are moved together to be assembled and fixed together in gripping engagement with said isolator; said control rod surrounded by said compressed isolator so as to prevent any contact between said control rod and said housing when said control linkage is operated.

2. The combination according to claim 1 wherein said housing pieces are fixed together by snap fit prongs on one housing piece received in respective receptacles on the other housing piece.

3. The combination according to claim 2 wherein said housing pieces are connected together with an integral hinge allowing said housing pieces to be swung together into abutment with each other to assemble the housing, and to be fit over and in engagement with said isolator.

4. The combination according to claim 3 wherein said housing pieces each have a recess defined therein, said recesses together forming an isolator receiving cavity when said housing pieces are assembled abutting each other enclosing and engaging said isolator.

5. The combination according to claim 4 wherein said housing isolator receiving cavity has said interference fit with said isolator when said housing pieces are assembled.

6. The combination according to claim 1 wherein said isolator is molded over said one rod end.

7. The combination according to claim 1 wherein said housing pieces are made of a hard plastic.

8. The combination according to claim 1 wherein said retention features comprise a prong on each housing piece projecting into said pin receiving cavity and being radially deflectable to be able to receive said headed portion on said pin and allow passage of said headed portion on said pin past said prongs, and engaging said headed portion of said pin after passage thereof past said prongs.

9. The combination according to claim 8 wherein said prongs are each formed with an axially extending wall radially spaced from a core portion of each of said housing pieces, and also having a lip projecting inwardly from said wall having a sloping under surface engaged by said headed portion of said pin to cause said radial deflection of said associated prong, and a blunt surface on each of said prongs engaging said headed portion after said headed portion has been inserted past said prongs to retain said pin in said cavity.

10. The combination according to claim 1 wherein a web is formed on each housing piece extending over said pin receiving cavity on one side to prevent insertion of said pin from said one side.

11. The combination according to claim 1 wherein said isolator has portions subjected to compression of a thickness of about one millimeter.

12. An arrangement connecting one end of a rod to a headed pin to enable establishing a driving connection between said pin and said rod, including:

a housing defining a pin receiving cavity with retention features around said cavity adapted to engage a portion of said headed pin so as to be retained therein;

a soft elastomeric isolator, fit to said one end of said rod to substantially enclose said one end;

said housing comprised of two pieces assembled and affixed together, each piece having an isolator engaging portion generally opposing an isolator engaging portion of the other piece to engage and enclose said isolator when said two pieces are fixed together in engagement with said isolator;

said housing pieces fixed together by snap fit prongs on the housing piece received in a respective receptacle on the other housing piece;

said housing pieces connected together with an integral hinge allowing said housing pieces to be swung together into abutment with each other to assemble the housing, and to be fit over and in engagement with said isolator;

said housing pieces each having a recess defined therein, said recesses together forming an isolator receiving cavity when said housing pieces are assembled abutting each other enclosing and engaging said isolator; and said one end of said rod having a groove formed therein, and said isolator having a portion fit into said groove, said isolator also having an aligned outer groove formed therein, and said housing pieces having portions fit into said isolator groove when assembled together over said isolator.

13. The arrangement according to claim 12 wherein said isolator has portions subjected to compression of a thickness of about one millimeter.

* * * * *